United States Patent [19]
Kamioka

[11] Patent Number: 5,493,548
[45] Date of Patent: Feb. 20, 1996

[54] OPTICAL RECORDING/REPRODUCTION APPARATUS

[75] Inventor: Yuuichi Kamioka, Takatsuki, Japan

[73] Assignee: Matsushita Electric Industrial Co., Ltd, Osaka, Japan

[21] Appl. No.: 247,833

[22] Filed: May 23, 1994

[30] Foreign Application Priority Data

May 25, 1993 [JP] Japan ..................................... 5-122515

[51] Int. Cl.⁶ .................................................. G11B 7/00
[52] U.S. Cl. .................. 369/48; 369/49; 369/59; 369/84; 369/83; 369/44.37
[58] Field of Search .................................. 369/84, 83, 85, 369/89, 54, 58, 47, 48, 49, 124, 44.37, 44.38

[56] References Cited

U.S. PATENT DOCUMENTS

| | | | |
|---|---|---|---|
| 5,034,941 | 7/1991 | Kasai et al. | 369/44.37 |
| 5,253,242 | 10/1993 | Satoh et al. | 369/44.37 X |
| 5,420,690 | 5/1995 | Koishi | 369/84 X |

FOREIGN PATENT DOCUMENTS

| | | |
|---|---|---|
| 0487296 | 5/1992 | European Pat. Off. . |
| 0506447 | 9/1992 | European Pat. Off. . |
| 0521454 | 1/1993 | European Pat. Off. . |
| 3263672 | 11/1991 | Japan . |
| 4170756 | 6/1992 | Japan . |
| 547000 | 2/1993 | Japan . |

*Primary Examiner*—Georgia Y. Epps
*Assistant Examiner*—Muhammad Edun
*Attorney, Agent, or Firm*—Panitch Schwarze Jacobs & Nadel

[57] ABSTRACT

In an optical recording/reproduction apparatus having M optical heads which records and reproduces video and audio data transferred in a high speed using a head to be used as a reference and keeping the rotation of a disk in synchronism with inputted or outputted television video or audio signals, respective heads have their data delay memories corresponding to respective disk rotation waiting delay time for their respective installation position difference from the reference head. By giving recording-permission signals at record-starting addresses for respective heads for the input data and by giving the reproduction-permission signal for respective heads for the output data, simultaneous recording and simultaneous reproduction on different tracks of a disk can be realized.

7 Claims, 11 Drawing Sheets a) Sector address signal from head 3 b) Sector address signal from head 7 c) Input data d) Data having arrived at head 3 e) Data having arrived at head 7 f) Recording-permission signal for head 3 g) Recording-permission signal for head 7 a) Sector address signal from head 3 b) Sector address signal from head 7 c) Input data for head 3 d) Input data for head 7 e) Data having arrived at head 3 f) Data having arrived at head 7 g) Recording-permission signal for head 3 h) Recording-permission signal for head 7

FIG. 8
a) Sector address signal from head 3
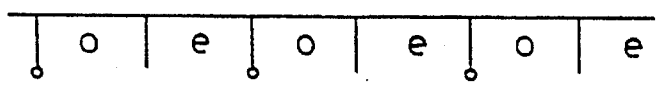
b) Sector address signal from head 7
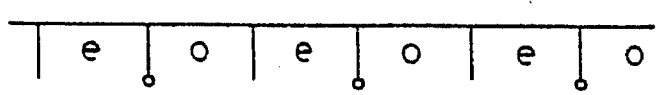
c) Input data
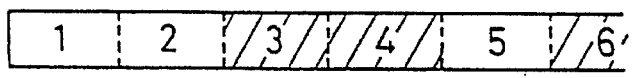
d) Data having arrived at head 3
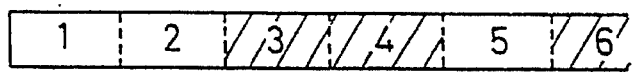
e) Data having arrived at head 7
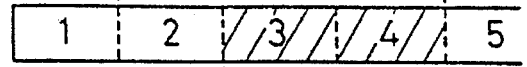
f) Recording-permission signal for head 3
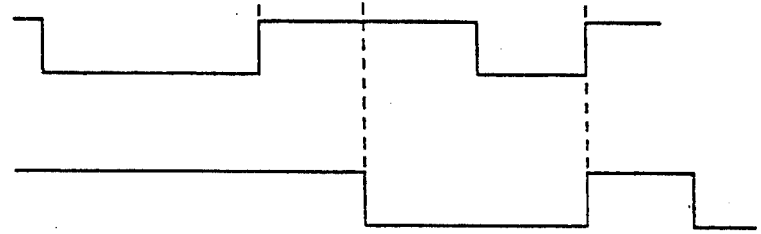
g) Recording-permission signal for head 7
h) Recorded data by head 3
i) Recorded data by head 7
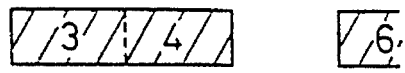

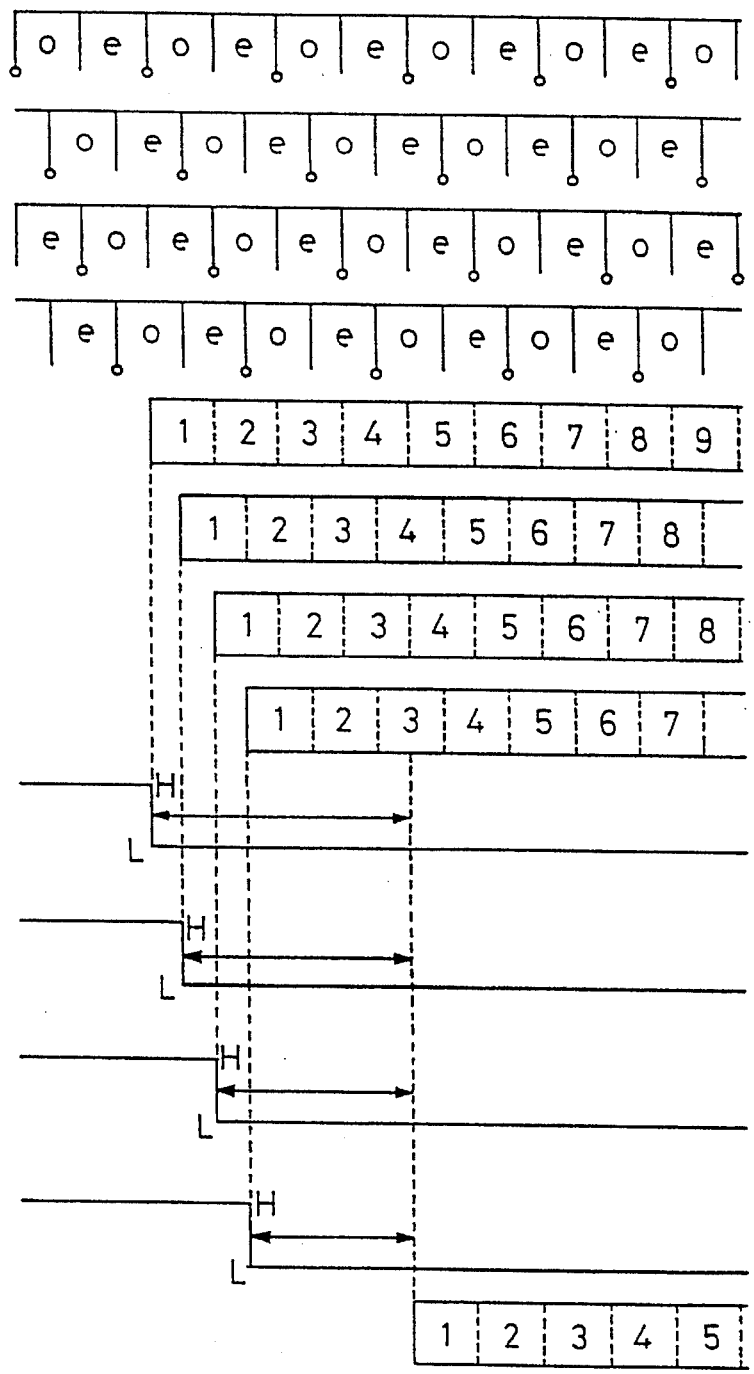

FIG.9 a) Sector address signal from head 3
b) Sector address signal from head 6
c) Sector address signal from head 5
d) Sector address signal from head 4
e) Data reproduce bu head 3
f) Data reproduce by head 6
g) Data reproduce by head 5
h) Data reproduce by head 4
i) Reproduction-permission signal for head 3
j) Reproduction-permission signal for head 6
k) Reproduction-permission signal for head 5
l) Reproduction-permission signal for head 4
m) Output data

FIG.11 a) Sector address signal from head 3
b) Sector address signal from head 7
c) Data read out by head 3
d) Data read out by head 7 e) Reproduction-permission signal for head 3
f) Reproduction-permission signal for head 7 g) Data read in by head 3
h) Data read in by head 7
i) Data read in by head 3 after passed through 4-field delay memory
j) Data read in by head 7 after passed through 3-field delay memory
k) Data combined by switcher

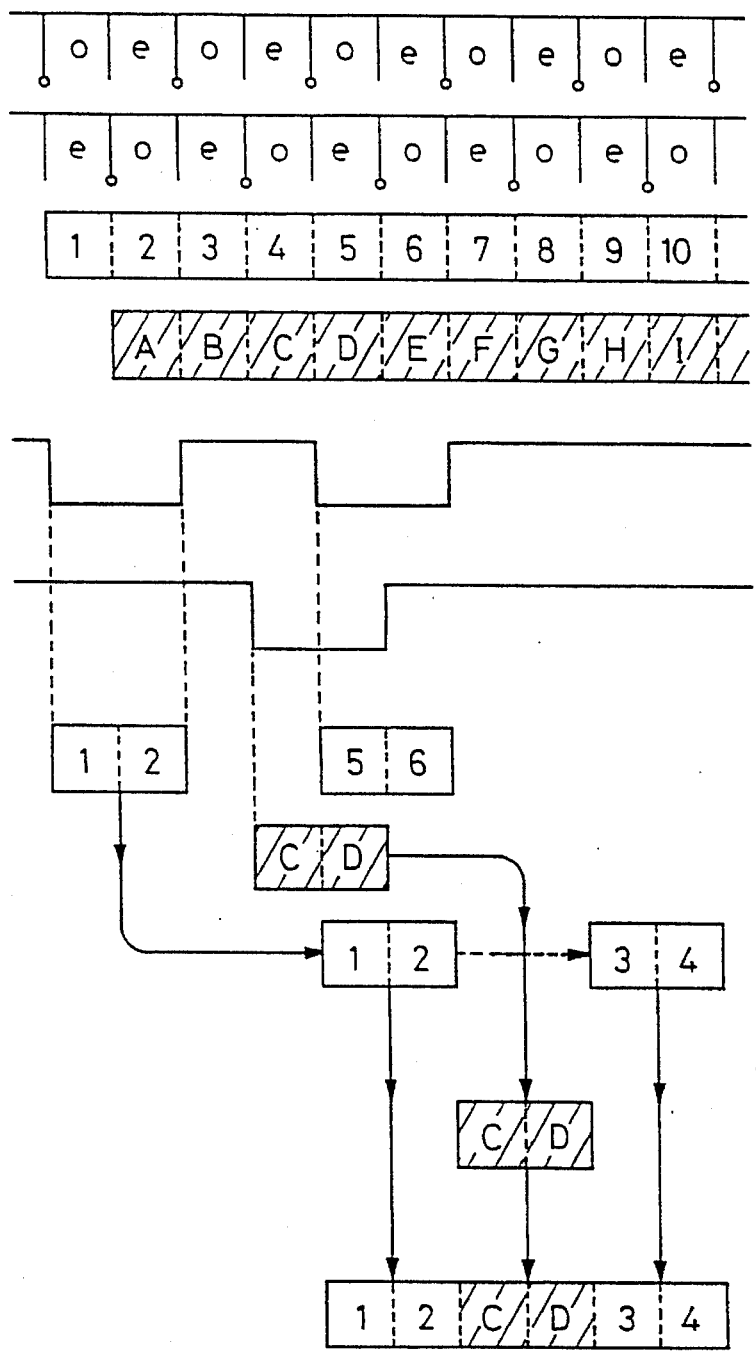

OPTICAL RECORDING/REPRODUCTION APPARATUS

BACKGROUND OF THE INVENTION

1. Field of the Invention

The present invention relates to recordings and reproductions to and from an optical disk using a plural number of optical heads.

2. Description of the Related Art

In the works of editing and sending-out filed information in broadcasting stations or the likes, chances of using optical disks are steadily increasing. In those works using optical disks, there are many advantages such as a high-speed search that is normally difficult by a video tape recorder (VTR). Furthermore, in a disk system in which a plural number of head groups are installed, those plural number of head groups can independently access over the disk plane. Thereby it becomes possible to realize such an operation as to make recordings of input raw materials simultaneously or successively on different several regions on a plane of a single optical disk, or to make simultaneous or successive reproduction and sending out of data which are already recorded on different regions on a plane of a single optical disk. In Tokkai Hei 08-268672 (Japanese Unexamined Patent Publication 263672/1991), a plural number of heads are installed to a single optical disk, and hence a simultaneous multi-input requests is acceptable. In this case, however, to accomplish the recording and reproduction of television video signals it is necessary to keep the synchronization between the synchronization signal of the video signal and the rotation phase of an optical disk, hence it becomes necessary to establish a special devicing to fulfill requests to input and output all the corresponding input signal by those multiple number of sets of heads.

OBJECT AND SUMMARY OF THE INVENTION

The purpose of the present invention is to provide an improved optical recording/reproduction apparatus having a plural number of heads. In this apparatus, the disk rotation speed is controlled by adjusting the phase between a sector synchronization signal and television video signal. The synchronization signal is reproduced from a reference head, which is one head selected from a plural number of heads. Recordings are performed by dividing the video-audio signal data assigning to the plural number of heads. And the reproducings are made similarly, by combining the divided and recorded signals. Furthermore, this apparatus can perform a simultaneous or successive recordings and reproductions of a plural number of different signals by using a plural number of sets of those head groups.

In the optical recording and reproduction apparatus in the present invention, in order to record and reproduce high transferring rate data which must be handled when the video-audio signals are digitized, N sets of optical head groups comprising M (M:natural integer) optical heads, into which data are divided and recorded and reproduced, are provided. And each head group is configured in a manner to make recording onto or reproduction from an optical disk mutually independently. Periphery of tile disk is surrounded by M×N optical heads. Rotation speed of the disk is controlled by a phase comparison between a sector synchronization signal reproduced from a reference head and a synchronization signal of input television video-audio signal. Individual heads are arranged successively in the order of the disk rotation direction starting from the reference head, for data inputted in synchronism with the reference head. Therefore, there is a delay time after a certain angle of disk rotation and before an arrival of a record-starting address to a position of a head on the disk through which head the recording is made. Therefore, to compensate such the delay time, each data delay memory is provided for each head. Thus the data arrives at each head with their respective intrinsic delay time corresponding to the disk rotation delay, and therefore when seen from the address of the disk, data arriving at those plural number of heads become in-phase relatively. At each individual head, recording is started by a reception of a recording-permission signal. In a case that a series of single data or a plural number of different video-audio data is to be recorded on different regions on the disk by a plural number of head groups, it can be done by inserting a delay time corresponding to the amount of the disk rotation delay after recognition of the above-mentioned record-starting address on the disk by the reference head, and then giving the recording-permission signal. In other words, by giving each recording-permission signal to each individual head through which the recording is to be made at respective timings when those Individual head recognizes its own record-starting address. In a case that a series of data inputted in synchronism with the reference head record on the disk successively at discrete different regions, the recordings can be made by giving the recording-permission signal to the heads in a head group, through which the successive recordings are being made at such particular timings that which were delayed as much as those corresponding to intrinsic waiting fields for respective heads. Such giving of the recording-permission signals at the particular timings can be made by repeating turning-on at a timing at which individual head recognizes its record-starting address and turning-off at a timing at which individual head recognizes its record-terminating address alternately.

At the time of reproduction, the rotation of the disk is synchronized with the television video-audio signal by the sector address signal reproduced from the reference head, and thereby the data are outputted to the outside. When the data are read out from the disk starting from the reference head, data delay memories are provided for respective heads. These data delay memories delay the data to wait until the time of reading out data by the head of latest data read timing from the disk, namely until the time of reading out data by the M×N-th head from the reference head. For this reason, the reference head has a largest waiting delay memory contrary to the case of recording. The read-out of the data recorded on the disk is started by a reproduction-permission signal. When that the data on different regions on the disk are read out by a plural number of head groups and sent out as mutually independent materials, respective reproduction-permission signals are respectively delayed as much as delay due to the disk rotation from the reference head to respective individual heads. Thereby, the respective data are sent out with the same timings at the time of send-out. For a case of successive reproduction in which data on recorded different tracks on the disk are read out separately by using a plural number of head groups, and combining the data for sending out as a series of successive video-audio data, the respective heads are subject to turning on and turning off of the reproduction-permission signal given with respective delays of corresponding rotation waiting delay to respective heads. In other word, in such case the reproduction permission signals are turned on at timings at which the respective head recognize its reproduction-starting addresses and turned-off at timings at which the respective head recognize its reproduction-termination addresses are given. Thereby, at the output end, read-out data from the respective heads become in-phase with the reference head, and a series of successive data output can be realized.

Furthermore, by combining the above-mentioned reproduction apparatus and recording apparatus, and by letting the head groups for reproduction and the head groups for recording operate at the same time, various operations such as simultaneous recording/reproduction, recording following reproduction, or reproduction following recording become possible.

BRIEF DESCRIPTION OF THE DRAWINGS

FIG. 8 is a control timing diagram at a time when a series of input data is recorded successively on scattered positions of a plural number of sets of tracks on a disk.

FIG. 9 is a control timing diagram at a time when a series of output data is reproduced by four heads of the first head group.

FIG. 11 is a control timing diagram at a time when data recorded on different plural number of sets of tracks on a disk are reproduced successively as a series of output data.

DESCRIPTION OF THE PREFERRED EMBODIMENTS

GENERAL CONFIGURATION

Figure 2:
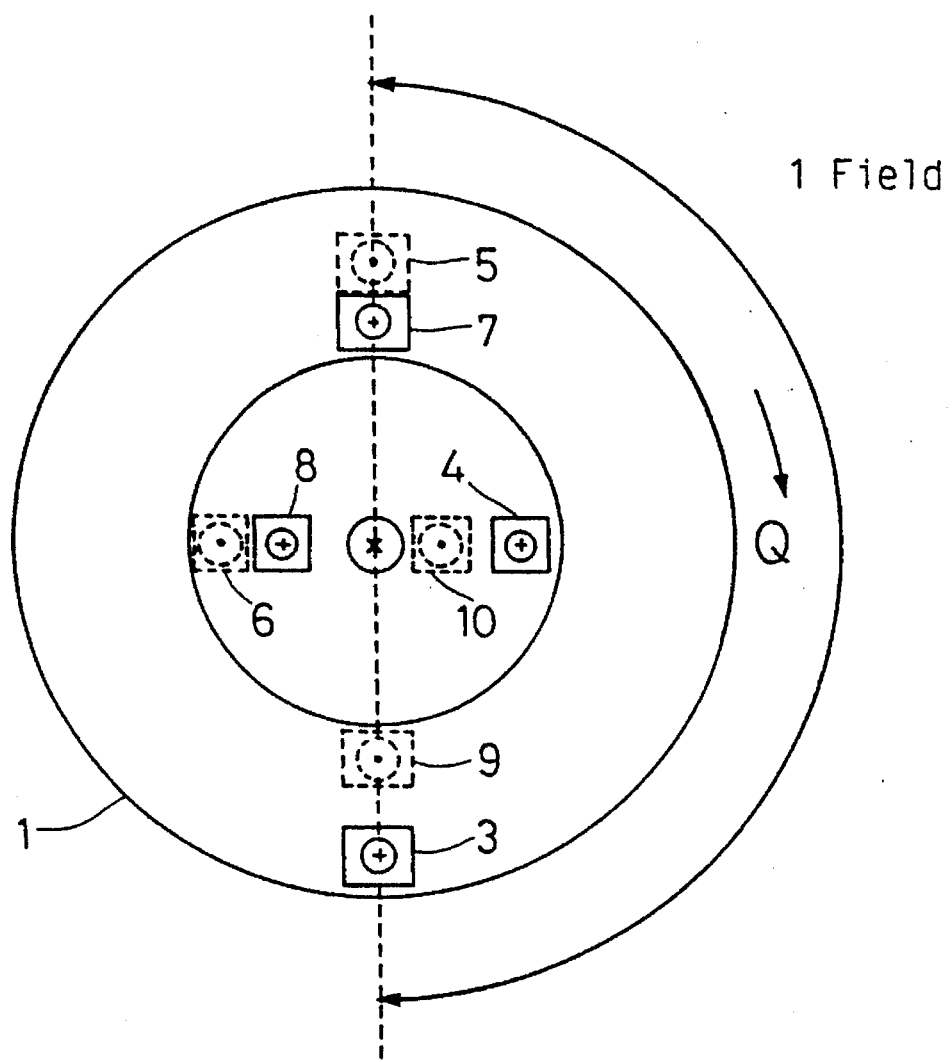
FIG. 2 is a plan view showing an arrangement of plural optical heads in the present embodiment.

In the following, explanation is given on preferred embodiments using drawings. In the present embodiment, by using a double-sided recording and reproduction disk which is made by gluing two single-sided optical disks whose one full-revolution is divided into two sector regions. In the gluing process, gluing is done so that those sector regions on both sides of an optical disks are laminated to superpose each other. One field of television video audio data is recorded on and reproduced from one sector region, and hence two fields of video-audio data are recorded and reproduced both on the surface side and the reverse side of one disk per one revolution. And in equi-sector regions, recording and reproduction region for odd-numbered fields and even-numbered fields of video signal are predetermined. In FIG. 2, right-half regions are for odd-numbered field recording and reproduction use, while left-half regions are for even-numbered field recording and reproduction use. In this optical recording/reproduction apparatus, data are recorded and reproduced by using a disk format of the MCAV (MODIFIED CONSTANT ANGULAR VELOCITY) scheme having two sets (N=2) of head groups of four optical heads (M=4) into which the data are divided.

Figure 1:
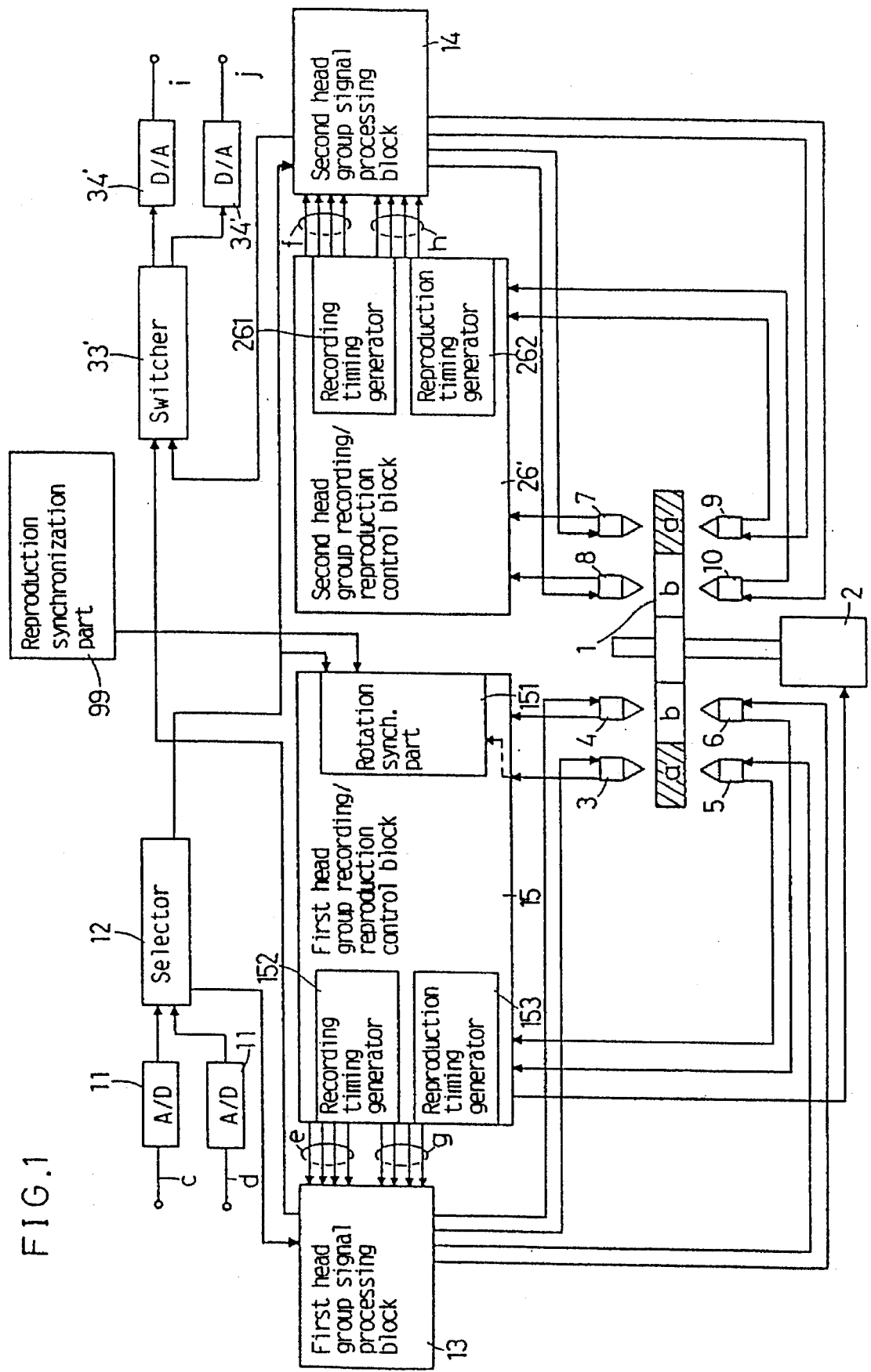
FIG. 1 is a block diagram of a system of an embodiment of the optical recording/reproduction apparatus in the present invention.

FIG. 1 shows an outline of this optical recording-reproduction apparatus. An optical disk 1 is revolved by a drive of a disk motor 2. The optical disk 1 is divided into an outer peripheral part "a" and an inner peripheral part "b". The recordings and reproducings on the surface side of the outer peripheral part "a" is made by an optical head 3, those on the surface side of the inner peripheral part b is made by an optical head 4, those on the reverse side of the outer peripheral part a is made by an optical head 5, and those on the reverse side of the inner peripheral part b is made by an optical head 6, respectively. These optical heads 3, 4, 5, and 6 are herein referred to as heads of a first head group. In the same manner, optical heads 7, 8, 9, and 10 are referred to as heads of a second head group. The optical head 7 is for reading and reproducing data on the surface side of the outer peripheral part "a". Similarly, the optical head 8 is for the surface side of the inner peripheral part "b", the optical head 9 is for the reverse side of the outer peripheral part "a", and the optical head 10 is for the reverse side of he outer peripheral part "b".

In FIG. 2, the disk 1 and an arrangement of heads when the system is seen from the upper side are shown. Those heads shown by solid lines represent those located on the surface side, while those heads shown by broken lines represent those located on the reverse side. In FIG. 2, the arrow Q indicates revolving direction of the disk. If we take the reference head to be the optical head 3, remaining optical heads 4, 5, and 6 of the first head group have their respective installation angular differences from the reference head of 270 degrees, 180 degrees, and 90 degrees, respectively. They correspond respectively as much as 3/2 fields, 1 field, and 1/2 field, respectively.

Positional relation between those heads of the first head group and those of the second head group is in the point-symmetry relation; and in respective pair consisting of two heads 3 and 7, pair 4 and 8, pair 5 and 9, and pair 6 and 10, either pair members of two heads have the same head movable range with each other, and there is an installation angular difference of as much as 1 field.

In the system of FIG. 1, there are an input signal c and an input signal d. Input data are converted by respective A/D converters 11. A selector 12 selects data as follow; the input signal c is switched over to a first head group signal processing block 13 and the input signal d is switched over to a second head group signal processing block 14, or the input signal c only or the input signal d only is switched over to both of the first head group signal processing 13 and the second head group signal processing block 14.

By the sector address of the leading sector region which is reproduced by the first head group, the video and audio signals are brought in synchronism with the sector address signal produced in the first head group recording/reproduction control block 15.

Figure 3:
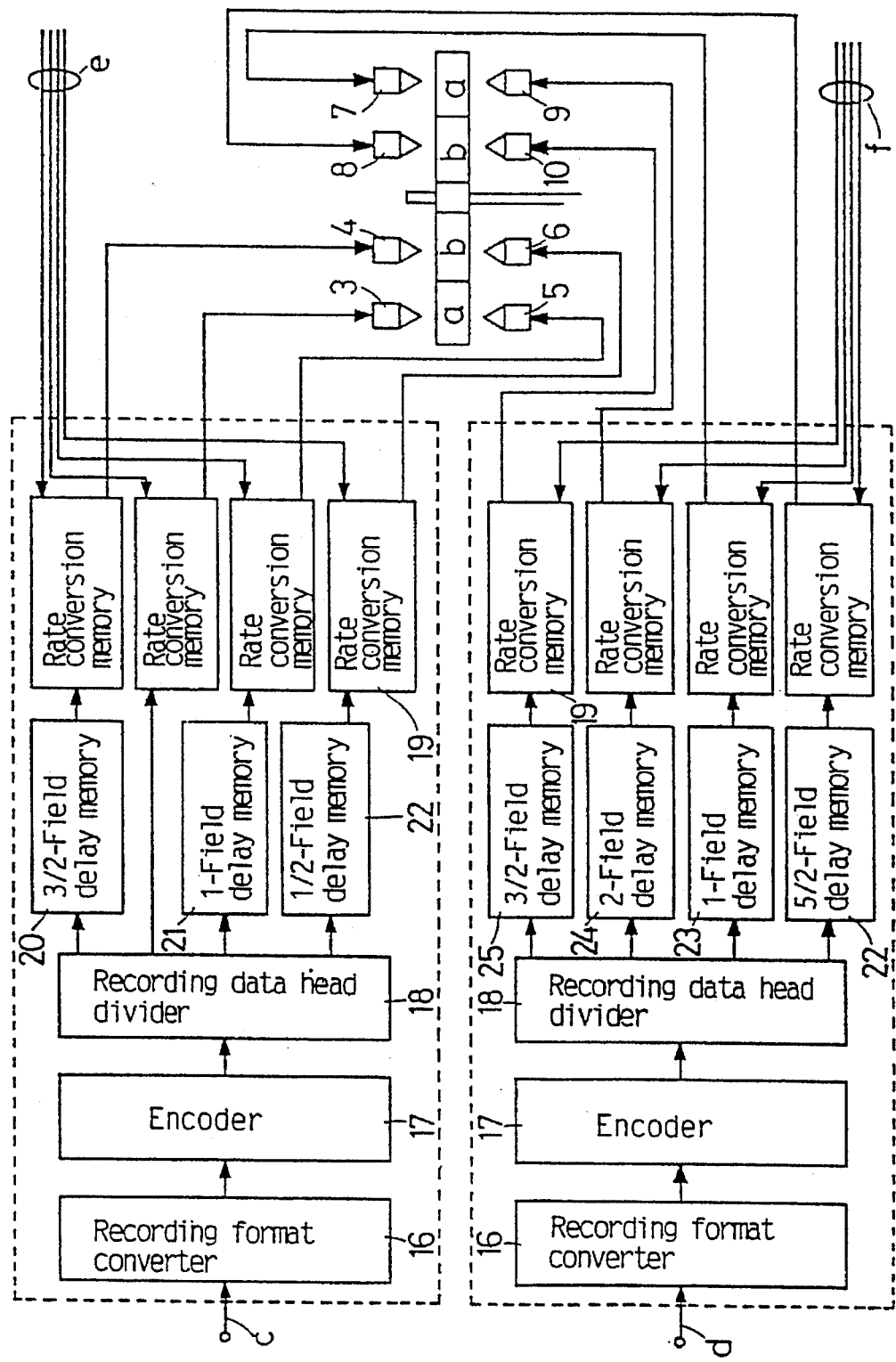
FIG. 3 is a detailed block diagram of recording signal processing system of a first and a second head groups.

FIG. 3 shows a recording system for the first head group signal processing block 13 and the second head group signal processing block 14 already shown in FIG. 1. By the selector 12 of FIG. 1, in case that the selection is made as the input data c are to the first head group and the input data d are to the second head group, the input data c and d are respectively converted into data formats for the optical disk by recording format converters 16 and are data-modulated in a modulation scheme which is suitable for the recording on the optical disk by encoders 17, and then data-divided by recording data head dividers 18. At the reference head 3 the divided data are directly written into a rate conversion memory 19. The data to be given to other optical heads 4, 5, and 6 are written into the rate conversion memories 19, after being delayed by a ³⁄₂-field delay memory 20, a 1-field delay memory 21, and ½-field delay memory 22. These delay memories are for making respective delay for letting data wait as much as the rotation delays caused by respective head installation positions.

In the second head group, respective heads have more rotation waiting delay as much as one-half revolution, that is, by an amount of one field, in comparison with that of the first head group. Therefore, at the optical heads 7, 8, 9 and 10, after delaying the data by a 1-field delay memory 23, a ⁵⁄₂-field delay memory 22, 2-field delay memory 24, and a ³⁄₂-field delay memory 25, the data are written into the rate conversion memories 19. In the rate conversion memories 19, at rates corresponding to respective zones of the MCAV scheme, data to be recorded are sent to the heads 3, 4, 5, and 6 of the first head group by the first head group recording-permission signal "e" produced by decoding a sector address for recording starting given from a recording timing generator 152 in the first head group recording/reproduction control block 15, the data are recorded on the disk. The above-mentioned recording timing generator 152 is synchronized with a rotation synchronization part 151. The rotation synchronization part 151 is further synchronized by decoding a sector address code for recording starting which is reproduced from the head 3 and by the television video signal as well as by a synchronization signal from a reproduction synchronization part 99 which is synchronized with an external reproduction synchronization part, such as studio synchronization line. In a similar manner, data are sent to the heads 7, 8, 9, and 10 of the second head group by the second head group recording-permission signal "f" produced by a recording timing generator 261 in the second head group recording/reproduction control block 26', and the data are recorded also on the disk.

Figure 4:
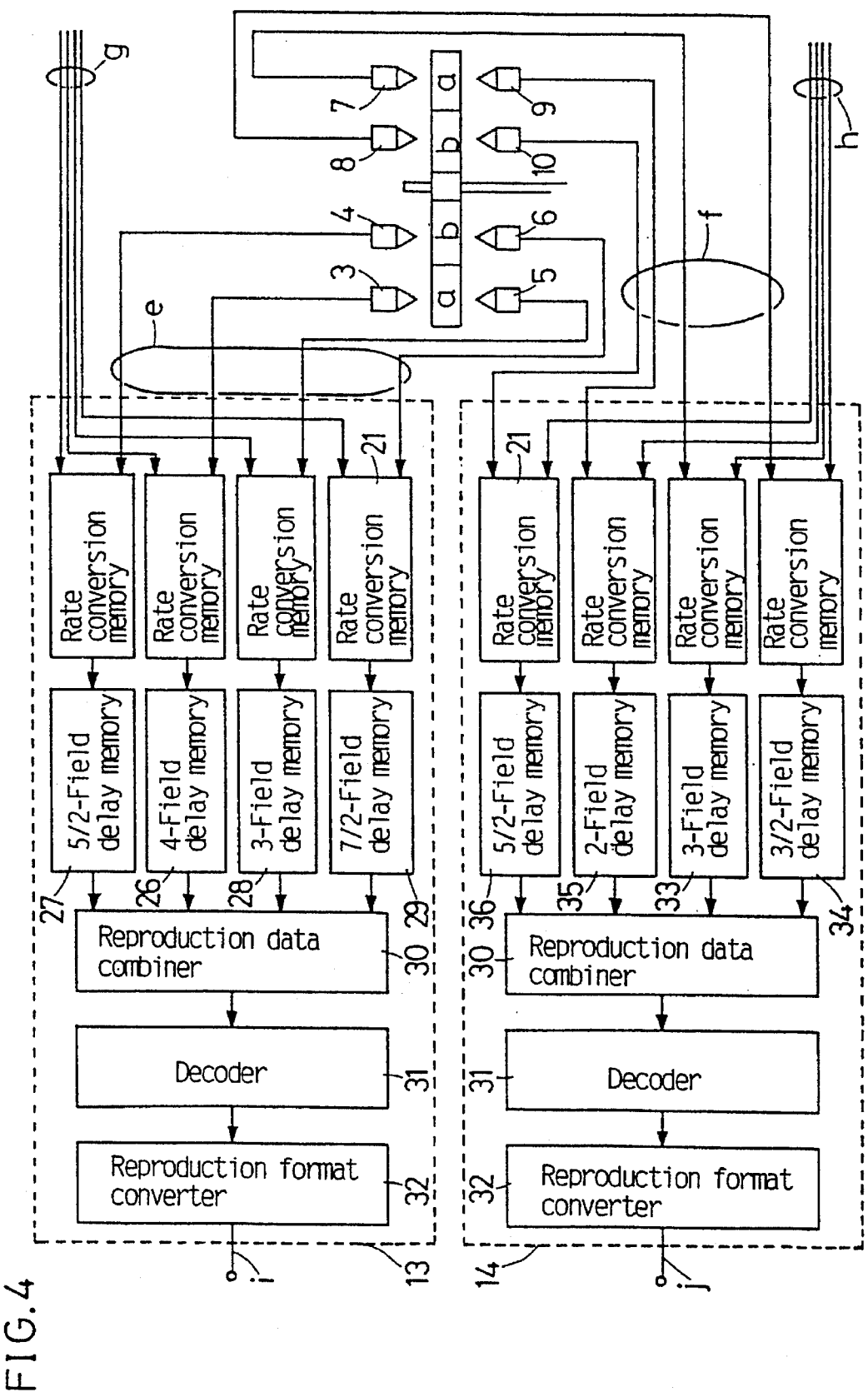
FIG. 4 is a detailed block diagram of reproduction signal processing system of a first and a second head groups.

At the time of reproduction, a first head group reproduction-permission signal "g" from the first head group recording reproduction control block 15 is given to heads 3, 4, 5 and 6 of the first head group, whereas a second head group reproduction-permission signal "h" from the second head group recording/reproduction control block 26' is given to heads 7, 8, 9 and 10. Thereby, data readouts from the disk through these groups of heads are started respectively and independently. Hereupon, the reproduction-permission signals "g" is generated by decoding a sector address code for reproduction starting from a reproduction timing generator 153 n the first head group recording/reproduction control block 15; whereas the reproduction-permission signal "h" is generated by decoding a sector address code for reproduction starting from a reproduction timing generator 262 in the second head group recording/reproduction control block 26'. Data thus read out are written in by rate conversion memories 21 shown in FIG. 4 in signal processing blocks 18 and 14 of FIG. 1 with specific rates intrinsic to respective zones of the disk. These data respectively from the heads 3, 4, 5, and 6 are read being delayed by a 4-field delay memory 26, a ⁵⁄₂-field delay memory 27, a 3-field delay memory 28, and a ⁷⁄₂-field delay memory 29 with a uniform rate. Phases of their read-out data are brought into synchronism with the sector synchronization signal of the reference head 3. i.e., with video-audio synchronization signal of the reproduction system. Then data from the heads 3, 4, 5 and 6 are combined by a reproduction data combiner 30. Next, it is demodulated by a decoder 31 and converted into the reproduction format by a reproduction format converter 32.

At the second head groups, data which are read out by the second head group reproduction-permission signal "h" are written into the conversion memory 21 at a rate for each zone and read out at a constant rate. The data which are read out from the optical heads 7, 8, 9, and 10 are sent to the reproduction data combiner 30 in synchronism with the reference head 3, respectively after being delayed by a 3-field delay memory 33, a ³⁄₂-field delay memory 34, a 2-field delay memory 35, and a ⁵⁄₂-field delay memory 36. Those data which were combined in the reproduction data combiner 30 are next demodulated by the decoder 31, and subsequently they are converted into a data format which are suitable for the reproduction system by the reproduction format converter 32.

Thus, the data i and j having passed through the first head group signal processing block 13 and the second head group signal processing block 14 in FIG. 1 are changed over by a switcher 33' of FIG. 1 so that i and J are outputted, or alternatively, either one of them are outputted as two routed outputs.

Data from the switcher 33' are converted into analog output video-audio signals by D/A converters 34'.

CONTROL SCHEME OF RECORDING

In the following, the control scheme of the recording-permission signal and the reproduction-permission signal is shown by a timing diagram in the case that the recording and reproduction are done by using a two sets of head groups each consisting of four heads.

Figure 5:
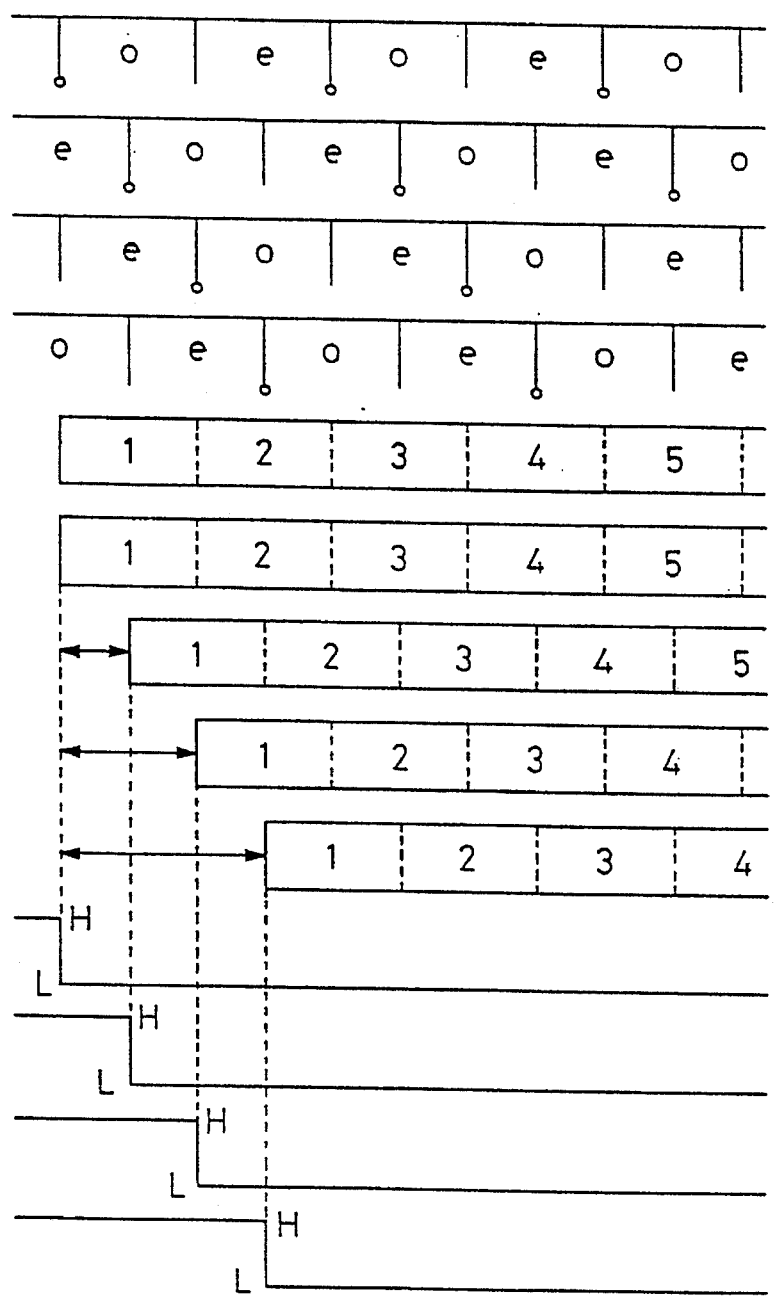
FIG. 5 is a control timing diagram at a time when a series of input data is recorded by dividing them to four heads of the first head group.

FIG. 5 is a timing diagram showing the recording timing by the first head group. In FIG. 5, parts a), b), c), and d) show address signals by which the heads 3, 4, 5, and 6 are respectively reproduced from the disk. There are timing lags of a multiples of ½ fields depending on the difference in head installation position. In the diagram, o indicates odd numbered recording areas on the disk plane, whereas e indicates even numbered recording areas. The input data e) are inputted in synchronism with the sector address signal a) from the reference head 3 without delay. The input data are divided for respective heads, and they are sent directly, after being delayed by a ½-field delay memory 22, by a 1-field delay memory 21, and by a ³⁄₂data delay memory 20, which are attached to respective heads except for the head 3, to the rate conversion memories 19, and reach there at timings of, f), g), h), and i). Therefore, by giving the recording-permission signals at respective timings J), k), l), and m) at which each head recognizes the record-starting address on the disk, phases of respective reached data coincide to each other. Therefore, the recording can be achieved irrespective of positional difference of the head installation in relation with the recording disc. In those recording-permission signals in the diagram of FIG. 5, L-level indicates the recording state, H-level indicates the recording termination.

Figure 6:
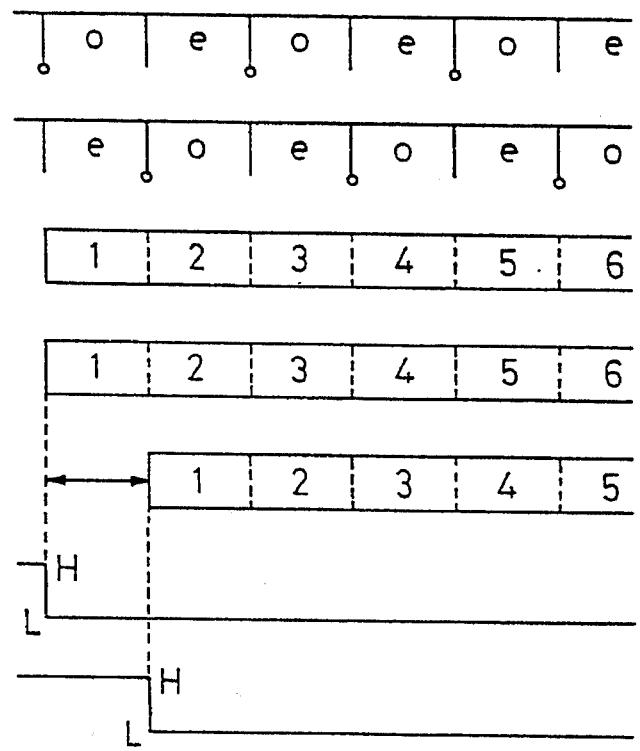
FIG. 6 is a control timing diagram at a time when a single same set of input data is recorded simultaneously on two sets of tracks on a disk by two sets of head groups.

The control timing for a case that a single same video signal data are recorded on different tracks on the disk using the first head group and the second head group is shown in FIG. 6. In the present embodiment, for those pairs of optical heads, 3 and 7, 4 and 8, 5 and 9, and 6 and 10, the head movable regions are the same, and hence their data formats are the same. And, for the positioning of respective heads, there are difference of as much as 1 field. Accordingly, here the control timing of the pair of optical heads 3 and 7 is to be explained as an representative example.

FIG. 6 shows a case that the input signal c is simultaneously recorded on different tracks of the disk by the first and second head groups. The selector 12 (FIG. 1) supplies the input signal c to both of the first head group signal processing block 13 and the second head group signal processing block 14. With respect to the sector address signal (a) to be read by the head 3 in the diagram, for the sector address signal (b) to be read by the head 7, there is a delay of as much as 180 degrees, that is, as much as 1 field. The input data (c) is in synchronism with the sector address signal (a) from the optical head 3 of the reference head. Now, the head 3 and the head 7 are on different tracks on the disk. Since the head 3 has no data delay memory, the input data c arrives at the head 3 without any delay as shown in (d). In the data timing (e) at which signal arrives at the head 7, there is a delay of as much as 1 field from the input data timing (c) given by the 1-field delay memory 23. Consequently, it coincides with the sector address signal (b) of the head 7. Accordingly, in a case of simultaneously recording the single same input data c) starting from the field 1 at the head 3 and the head 7, the timings f) and g) of the recording-permission signal as shown in the diagram are to be given. For the recording-permission signal shown in the diagram, when it is at L level, data recording onto the disk is done, whereas the recording is terminated when it is at H level.

Figure 7:
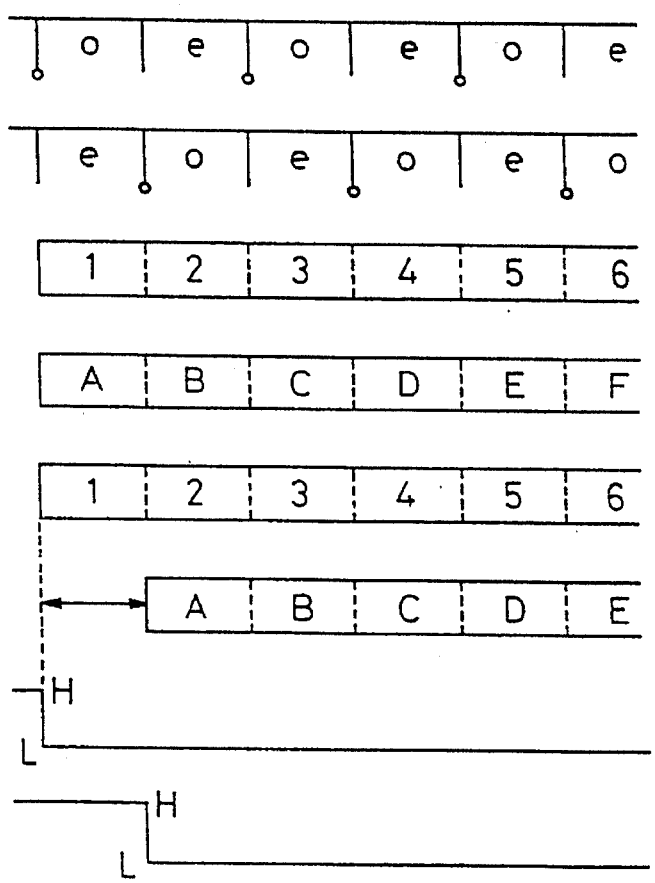
FIG. 7 is a control timing diagram at a time when two different sets of input data are recorded simultaneously on two sets of tracks on a disk by two sets of head groups.

FIG. 7 shows a case that different data inputted from two different routes are recorded on the different tracks. Those input data c and d to the head 3 and the head 7 are selected by the selector 12 of FIG. 1 in a manner that they are supplied to the first head group signal processing block 13 and the second head group signal processing block 14. The data c and d are in synchronism with the sector address signal (a) of the head 3. Therefore, when the recording starts from 1 of the input data timing (c) of the head 3 and it starts from (A) of the input data timing (d) of the head 7, different input data c and d can be recorded simultaneously on different tracks, by delaying the recording-permission signal timing (h) for the head 7 by an amount of one field from the recording-permission signal timing (g) for the head 3 similarly to the case of FIG. 6.

FIG. 8 shows a case that input data c are recorded successively without having lack of data on different tracks. Fields 1 and 2 of the input data c are recorded by the head 3, and then successively, fields 3 and 4 are recorded by the head 7, field 5 is recorded by the head 3, and field 6 is recorded by the head 7. Then the data timing (e) at which data arrive at the head 7 has a delay of one field from the data timing (d) at which data arrive at the head 3. Therefore, after lapse of one field after a turning off of the permission signal (f) for the head 3, the permission signal (g) for the head 7 is turned on; and at the time before one field to a turning off of the permission signal (g) for the head 7, the permission signal (f) for the head 3 is turned on. That is, the timing (g) of the recording-permission signal for the head 7 is such a timing that the data to be recorded by the head 7 are delayed by one field from the case that the data were to be recorded by the head 3.

REPRODUCING SYSTEM

Figure 10:
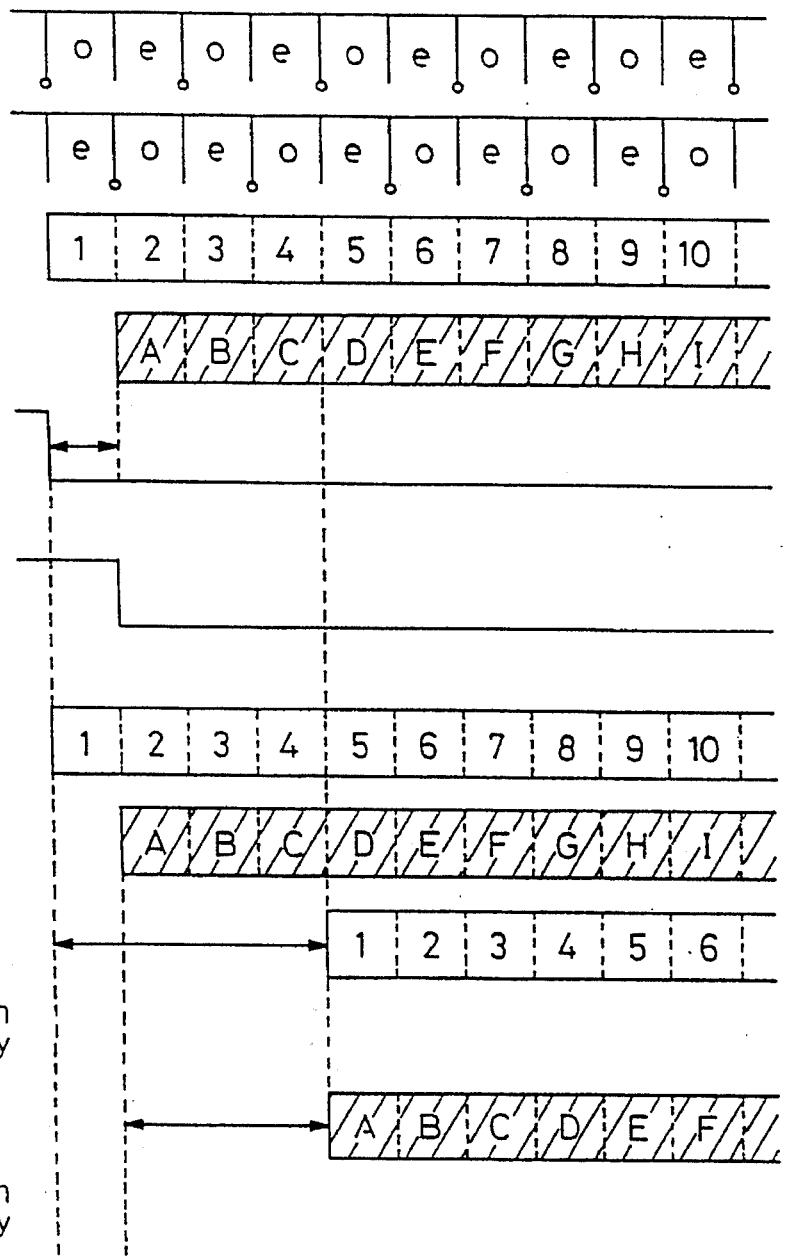
FIG. 10 is a control timing diagram at a time when data recorded on different two sets of tracks on a disk are reproduced simultaneously.

Now, explanation is given on a reproduction system by which the data are read out from the optical disk and they are outputted to outside. FIG. 9 shows the reproduction control timing using the first head group. The sector address signals repoduced by the optical heads 3, 4, 5, and 6 are shown in (a), (b), (c), and (d). The timing relation of sector address signals obtained from respective heads are determined by fixing locations of the respective heads, and the relation is inherent to each apparatus. Therefore, they are the same as to the sector address signals shown in FIG. 5. Data thus head-divided onto these sectors which are to be read out are being recorded on the disk as shown in (e), (f), (g) and (h). The reproduction-permission signals are made to on-state at the leading address of the data to be read out as shown in (i), (j), (k) and (1). Thereby, phases of the output data are made to synchronize with the sector address signal (a) of the head 3 when passed through the rate conversion memories 21, the 4-field delay memory 26, the 7/2-field delay memory 29, the 3-field delay memory 28, and the 5/2-field delay memory 27. Thereafter, they are combined as a series of data (m) by the reproduction data combiner 30. In the reproduction-permission signal, data are read out from the disk at the L-level, and the reading-out from the disk is terminated with the H-level. FIG. 10 illustrates an example case wherein different data on different tracks on the disk are reproduced by the heads 3 and 7, and they are sent out simultaneously as different two routed outputs. In the example, optical heads 3 and has the same movable regions as well as the same reproduction regions. The sector address signal (b) reproduced by the head 7 has a rotation waiting delay of as long as one field with respect to the sector address signal (a) reproduced by the head 3. Therefore, the reproduction-permission signal (f) of the head 7 is turned to the on-state after a delay of an amount of one field from the reproduction-permission signal (e) of the head 3. In other words, this corresponds to a timing when the sector address of the data (d) is read out by the head 7. Data (g) reproduced by the head 3 are delayed as long as four fields by the 4-field buffer memory 26, resulting in (i). Thus, (i) becomes in-phase with the data (j), which is output of data (h) read out by the head 7 and delayed by the 3-field delay memory 33. Then these two data (i) and (j) are outputted in synchronism with the sector address signal (a) a of the head 3, which is the reference head.

FIG. 11 shows a case that data recorded on different tracks on the disk are reproduced by the head 3 and the head 7, then they are gathered into a single video or audio data by the switcher 33, thereby to send out as one-routed output. Next a case of sending out a total of 6 fields consisting of the fields 1 and 2 of data c) read by the head 3, the fields (C) and (D) of data d) successively read by the head 7 and the field 5 and 6 of data c) read by the head 3 as a series of successively continuing data of 6 field is considered. In this case, similarly to in FIG. 8, the reproduction-permission signal f) for the head 7 is turned on at a time which is after a delay of one field after the reproduction-permission signal e) for the head 3 was turned off. That is, the reproduction-permission signal e) for the head 3 is turned on at the time of one field prior to a turning-off of before the reproduction-permission signal f) for the head 7. That is, on and off of the permission signals are made alternately by the head 3 and the head 7. Particularly concerning the head 7, this alternate on-off is done by delaying it by one field corresponding to the head installation position difference. Data read out by the head 3 are delayed as long as four fields by the 4-field delay memory 26 (FIG. 4), and data read out by the head 7 are delayed as long as three fields by the 3-field delay memory 33 (FIG. 4), and inputted into the switcher 33' (FIG. 1) at the sector address signal from the head 3, which is the reference head as shown by (i) and (j) (FIG. 11). Therefore, by changing over the data responding to the data, data on different tracks on the disk can be sent out as a series of successive data by the timing shown by (k) of FIG. 11.

The present optical recording/reproduction apparatus has a plural number sets of optical head groups. Therefore, by allotting those head groups to reproduction optical head groups and recording optical head groups, even a special type recording-reproduction operation can be made. One example of such special recording-reproduction is a combination of recording and reproduction (send-out) such as performing the reproduction of data recorded on a disk while simultaneously with recording of the input data. This is made by combining the recording-permission signal and the reproduction-permission signal. Furthermore, the above-mentioned simultaneous recording on different tracks includes such operations as (I) after making a recording on one track by an arbitrary head group, followed by subsequent recording on the same track with a certain delay time, and (II) a simultaneous reproduction by an arbitrary head group from different tracks followed by a reproduction from the same track.

Furthermore, any influence due to positional deviation between sector regions of the surface side and the reverse side attributable to the gluing process on recordings and reproductions on a double-sided optical disk can be corrected and eliminated. Such correction can be made by adding a gluing deviation detection unit for detecting amount of the deviation and a correction amount memory for setting the amount to be corrected to offset the deviation.

What is claimed is:

1. An optical recording apparatus comprising:

an optical disk which is divided into sector regions in a manner that one sector corresponds to one field of television video signal and revolves at a constant angular velocity, and N sets (N is a natural integer) of optical head group each having M optical heads (M is a natural integer which is not simultaneously 1 with N) for recording inputted series of video and/or audio data by dividing them by M on tracks on the optical disk, M×N optical heads being arranged in a manner that they are disposed on said optical disk with a given order and given spacings and that one out of said M×N optical heads being taken as a reference head, rotation synchronization means for controlling the rotation of the disk by synchronizing a sector address signal disposed at the top of said sector region reproduced by said reference head with respect to a field timing of the input television video-audio signal, delay memories for delaying the video-audio data which were inputted in synchronism with said field timing until a timing when said heads come to those respective sector regions on which the recording is started, and timing generation means for generating a recording-permission signals for respective heads at timings at which respective heads reproduce said sector address signal of said sector regions from which those respective heads start to record, whereby a series of video and/or audio data are recorded as many as N sets by dividing those data into M tracks regardless of the installation position of respective heads.

2. An optical recording apparatus in accordance with claim 1, wherein a single series of video and/or audio data inputted in synchronism with sector address signal reproduced by said reference head are recorded on N sets at maximum (N is a natural integer equal to or more than 2) of tracks on an optical disk, by generating the recording-permission signal at timings at which respective heads of N sets at maximum of optical head groups reproduce sector address signals of sector regions on which respective heads is to start recording.

3. An optical recording apparatus in accordance with claim 1, wherein

N different kinds at maximum (N is a natural integer equal to or more than 2) of video and/or audio data inputted in synchronism with sector address signal reproduced by said reference head are recorded on N sets at maximum of tracks, by generating the recording-permission signal at timings at which respective heads of optical head groups for recording reproduced sector address signals of sector regions on which respective heads is to start respective recordings.

4. An optical recording apparatus in accordance with claim 1, wherein a single series of video and/or audio data inputted in synchronism with sector address signal reproduced by said reference head are recorded successively on a plural number of tracks on an optical disk, by starting to generate the recording-permission signal at timings at which respective heads of optical head groups for recording reproduce sector address signals of sector regions on which respective heads is to start the recording, then terminating to generate the recording-permission signal at timings of reading out of sector address signals at which the recording is to be terminated, and then successively generating the recording-permission signal at timings at which respective heads of optical head groups for recording reproduce sector address signals of sector regions on which respective heads is to start respective recordings.

5. An optical reproduction apparatus comprising an optical disk which is divided into sector regions in a manner that one sector corresponds to one field of television video signal and revolves at a constant angular velocity and onto which a series of video and/or audio data are being recorded by dividing them into M (M: natural integer) tracks, and N sets (N is a natural integer, which is not simultaneously 1 with N) of optical head groups comprising M optical heads for reproducing said divided data, M×N optical heads being arranged in a manner that they are disposed on said optical disk with a given order and given spacings, and that one out of said M×N optical heads being taken as a reference head a rotation synchronization means for controlling the rotation of the disk by synchronizing a sector address signal disposed at the top of said sector region reproduced by said reference head with respect to a field timing of the reproduced television video-audio signal, delay memories, for each of said respective heads, to make the output of those data which were read out at different timings due to the different installation positions of respective heads in synchronism with the reference head, and timing generation means for generating the reproduction-permission signals for respective heads at timings at which respective heads reproduce said sector address signal of sector regions in which the data to be reproduced by respective heads, whereby N sets of series of video and/or audio data are outputted from said head groups of M heads having different installation positions in synchronism with respect to the reference head.

6. An optical reproduction apparatus in accordance with claim 5, wherein a plural number of video or audlo data which are recorded on N sets at maximum of tracks on an optical disk are outputted in synchronism with the sector address signal which were reproduced by the reference head by giving the reproduction-permission signal at timings at which respective heads of N sets at maximum (N is a natural integer equal two or more than 2) of optical head groups reproduce the sector address signals of sector regions to be reproduced.

7. An optical reproduction apparatus in accordance with claim 5 wherein video and/or audio data which are recorded on a plural number of sets of tracks on a disk are successively combined and sent out as a single series of data, by generating a reproduction-permission signal at timings at which respective heads of head groups through which data are read out reproduce the sector address signal of sector regions to be reproduced, terminating to generate the reproduction-permission signal by said sector address signal of readout-termination sector, and successively generating the reproduction-permission signal at timings at which respective heads of head groups for reproduction reproduce said sector address signals of sectors to be reproduced.

* * * * *